United States Patent [19]

Kamiya et al.

[11] 4,252,690
[45] Feb. 24, 1981

[54] METALLIC CATALYST AND PROCESS FOR PREPARING THE SAME

[75] Inventors: Kunio Kamiya, Hitachi; Hideo Yusa, Katsuta; Hiroyuki Tsuchiya, Hitachi, all of Japan

[73] Assignee: Hitachi, Ltd., Tokyo, Japan

[21] Appl. No.: 950,460

[22] Filed: Oct. 11, 1978

[30] Foreign Application Priority Data

Oct. 12, 1977 [JP] Japan .................................. 52-121995

[51] Int. Cl.³ .................... B01J 21/04; B01J 21/06; B01J 23/18; B01J 23/64
[52] U.S. Cl. .................................. 252/470; 252/461; 252/463; 252/467; 252/472; 252/477 R
[58] Field of Search ............... 252/466 J, 477 R, 461, 252/463, 467, 470, 472; 423/213.5; 428/642, 660

[56] References Cited

U.S. PATENT DOCUMENTS

| 3,437,605 | 4/1969 | Keith | 252/463 |
|---|---|---|---|
| 3,712,856 | 1/1973 | Betz | 204/29 |
| 3,873,472 | 3/1975 | Oshima et al. | 252/466 B |
| 3,923,696 | 12/1975 | Chart et al. | 252/470 X |
| 3,956,187 | 5/1976 | Betz | 252/457 |
| 3,969,480 | 7/1976 | Fedor et al. | 252/477 R |
| 4,003,976 | 1/1977 | Komatsu et al. | 423/213.5 |
| 4,058,485 | 11/1977 | Cheung | 252/477 R |

*Primary Examiner*—W. J. Shine
*Attorney, Agent, or Firm*—Thomas E. Beall, Jr.

[57] ABSTRACT

A metallic catalyst of three-layer structure of a carrier metal, an interlayer metal having a heat-insulating property by itself, or an interlayer metal capable of forming an oxide having a heat-insulating property or a catalyst surface area-increasing property, deposited on the entire surface of the carrier metal, and a catalyst metal deposited on the interlayer metal is prepared in a shorter production time at a lower cost through simplified process steps by depositing the interlayer metal and the catalyst metal by plating, if necessary, followed by oxidation, or both oxidation and reduction. The metallic catalyst has an improved catalytic activity, especially at a low temperature, in addition to the high mechanical strength.

47 Claims, 5 Drawing Figures

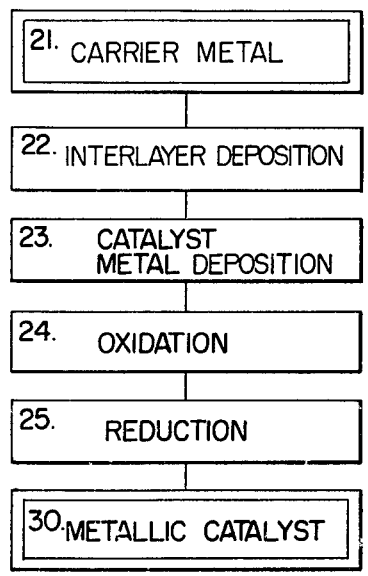
FIG. 3 PRESENT INVENTION
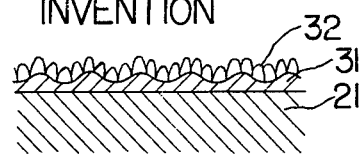
FIG. 4 PRESENT INVENTION
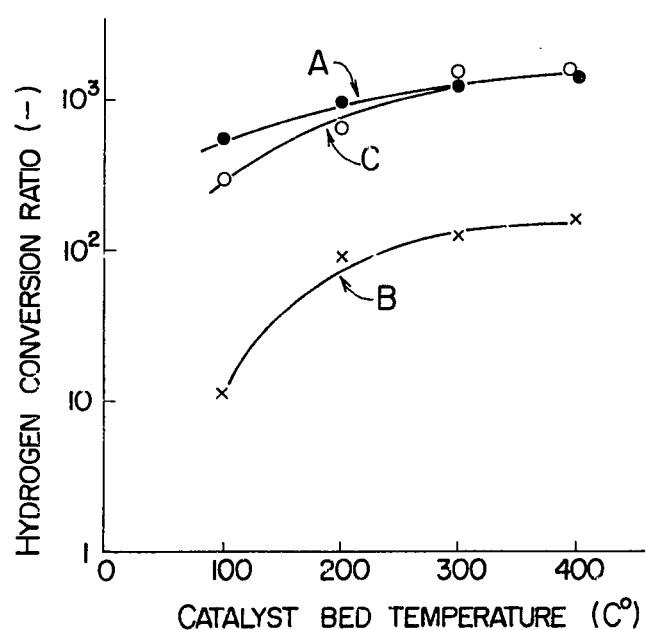
FIG. 5

METALLIC CATALYST AND PROCESS FOR PREPARING THE SAME

BACKGROUND OF THE INVENTION

This invention relates to a metallic catalyst, particularly to a metallic catalyst applicable to recombination of oxygen and hydrogen present in a reactor off-gas to water, and also to a process for preparing said metallic catalyst.

Heretofore, various kinds of catalysts have been employed in many fields including the chemical industry and the atomic power generation to remove impurities from effluent gases and product gases or produce the desired products. A low cost, a high catalytic performance, that is, a high catalytic activity, and a high mechanical strength are required for these catalysts, and catalysts have been researched and developed to satisfy these requirements. However, the performance of a catalyst depends mainly upon a catalyst metal. Thus, in order to improve the catalytic activity, it is necessary to increase a surface area of a catalyst carrier and uniformly distribute the catalytic metal on the carrier. To this end, ceramics such as alumina, etc. have been so far employed as a catalyst carrier, and catalyst metal is supported on the carrier. That is, the so-called ceramic catalysts have been used. However, this type of the catalysts are readily susceptible to attrition owing to vibrations generated when packed or while used, and the resulting catalyst powder scatters, often causing a local reaction or troubles such as cloggings, etc. to apparatuses, devices, etc. such as valves. Furthermore, the performance of the catalyst itself, that is, catalytic activity, is deteriorated by the attrition.

As a substitute, a metallic catalyst consisting of a metal having a high attrition resistance as a carrier, and a catalyst metal supported thereon has been proposed, and employed. Though the metallic catalyst is hardly susceptible to the attrition owing to the vibration when packed, etc., a catalyst performance is generally low, and the thickness of a catalyst layer is large.

To improve these disadvantages of such a metallic catalyst, other metallic catalysts have been proposed (U.S. Pat. Nos. 3,712,856 and 3,956,189). However, in the proposed metallic catalysts, catalyst metal palladium is mainly supported on alumina locally exposed to the surface of catalyst carrier, and thus the entire surface of the catalyst carrier is not utilized, and an improvement of the catalytic activity cannot be expected so much. Furthermore, a portion of the catalyst metal palladium is in direct contact with the metallic carrier, and thus a temperature drop of the catalyst metal is so large that, in a low temperature gas atmosphere, the heat of reaction cannot be retained on the catalyst metal, lowering the catalytic activity.

SUMMARY OF THE INVENTION

An object of the present invention is to overcome these problems of the conventional art and provide a metallic catalyst having a good catalytic activity, particularly a good catalytic activity at a low temperature, and a process for preparing such a metallic catalyst through simple steps.

The present invention provides a metallic catalyst comprising a carrier metal and a catalyst metal supported on the carrier metal, characterized in that an interlayer having a high heat-insulating or a catalyst surface area-increasing property is provided between the carrier metal and the catalyst metal, so that the interlayer can coat the entire surface of the carrier metal.

The present invention further provides a process for preparing a metallic catalyst comprising a carrier metal, an interlayer having a high heat-insulating property or a catalyst surface area-increasing property supported on the entire surface of the carrier metal, and a catalyst metal supported on the surface of the interlayer, which comprises a step of coating the interlayer on the entire surface of the carrier metal, and a step of depositing the catalyst metal on the interlayer.

According to the present invention, the entire surface of carrier metal is coated with an interlayer having a heat-insulating property or a catalyst surface area-increasing property, whereby a temperature drop of the catalyst metal can be prevented and a low temperature catalytic activity can be increased, or a catalyst surface area can be increased to improve a catalytic activity.

Furthermore, according to the present invention, a metallic catalyst of said structure can be prepared through simple steps by coating a carrier metal with a metal of low thermal conductivity or high catalyst surface area-increasing property as such as the interlayer, or a metal capable of forming an oxide having a low thermal conductivity as the interlayer, and depositing a catalyst metal on the interlayer, followed by oxidation, and if necessary, reduction of the catalyst metal, whereby the process can be much simplified and the desired metallic catalyst can be prepared at a lower production cost in a shorter production time with less fluctuations in the process conditions, that is, under better quality control.

In the present invention, any carrier metal can be used, so long as it is a metal having a good adherence to the interlayer and a good porosity, and iron, nickel, nickel-aluminum alloy, and nickel-chromium alloy can be used as the carrier metal in the present invention. The carrier metal can take any of plate form, net form, or perforated form, granular form, etc., depending upon the end use and service conditions of the catalyst.

Any metal can be used as a metal for the interlayer to be supported on the entire surface of the carrier metal, so long as it is a metal having a good heat-insulating property to prevent the heat conduction to the carrier metal, or a good catalyst surface-area-increasing property, or a metal capable of producing an oxide having the good heat-insulating property. Particularly, a metal having a low heat conductivity by itself, such as titanium, zirconium, antimony, and their alloys or a metal capable of producing an oxide having a low heat conductivity such as titanium, zirconium, antimony, palladium, aluminum, chromium or their alloys are effective as the material for the interlayer. Among these metals for the interlayer, aluminum can produce alumina in an oxidation step, and can effectively increase the heat-insulating action as well as a dispersibility of catalyst metal.

As the interlayer metal capable of increasing the catalyst surface area, titanium, chromium, aluminum, and their alloys including nickel-chromium alloy (25% Cr) are effective.

As the catalyst metal, the conventional catalyst metals so far employed can be used in the present invention, depending upon the end use of the catalyst. For example, palladium can be used for removing oxygen and hydrogen present in nuclear reactor off-gases, and platinum can be selected for removing acetylene from the exhaust gas in the acetylene industry.

The present metallic catalyst basically comprises a three-layer structure of a carrier metal, an interlayer having a good heat-insulating property or a good catalyst surface area-increasing property supported on the entire surface of the carrier metal, and a catalyst metal deposited on the interlayer, and can also include such metallic catalysts of three-layer structure, as prepared by directly oxidizing the surface of the carrier metal to form an oxide layer having a good heat-insulating property or a catalyst surface area-increasing property as an interlayer on the entire surface of the carrier metal, and depositing a catalyst metal on the oxide layer as the interlayer, or as prepared by directly depositing a catalyst metal on a carrier metal, oxidizing the surface of the carrier metal and the catalyst metal together, and then reducing only the catalyst metal oxide to the catalyst metal.

The interlayer metal can be deposited on the entire surface of the carrier metal by the well known coating or deposition method including electroplating, chemical plating, dipping, vapor deposition, etc.

The catalyst metal can be deposited on the interlayer by the well known method including electroplating and chemical deposition, that is, chemical reduction of salt solution.

When palladium is electroplated as a catalyst metal on various interlayer metals, and the state of deposited palladium is observed by a scanning type electron microscope, it is seen that, when palladium is electroplated on the surface of interlayer metal capable of readily forming stable oxides, such as chromium, titanium, or aluminum, the palladium can be deposited in a dispersed spherical state on the surface of the interlayer metal. When the amount of deposited palladium is increased by further conducting the electroplating, spherical palladium can further grow three-dimentionally on the deposited spherical palladium by the further electroplating to increase the surface area of palladium as the catalyst metal. In other words, when metals having higher absolute values of a standard free energy change, $|\Delta Fo|$, in the formation of oxides than that of iron are used as the interlayer metal, the surface area of the deposited palladium is increased in proportion to the increasing amount of the deposited palladium, and thus the catalytic activity of the catalyst metal palladium is increased.

Relations between $\Delta Fo$ when oxides of various interlayer metals are formed, and the state of the deposited palladium are given in Table 1, where $\Delta Fo$ indicates the value at 500° C. under the atmospheric pressure. It can be presumed that a stability of oxide is proportional to the absolute value of $\Delta Fo$.

The palladium is deposited on the interlayer of Ni-Cr alloy (25% Cr), Cr, Ti and Al in a spherical, distributed state, and can grow three-dimentionally with the increasing amount of palladium to cover the surface of the interlayer, whereby the catalytic activity of palladium can be increased. Thus, among the interlayer metals capable of forming the oxide having a good heat-insulating property, the metals having good catalyst surface area-increasing property at the same time are aluminum, titanium, chromium, and their alloys such as nickel-chromium alloy (25% Cr).

The characteristics of the interlayer metals used in the present invention are summarized in the following Table 2.

TABLE 2

| Interlayer metal | Low heat conductivity by itself | Low heat conductivity by its oxide | Larger $\Delta Fo$ in its oxide, capable of increasing of catalyst surface area |
|---|---|---|---|
| Ti | Yes | Yes | Yes |
| Zr | Yes | Yes | None |
| Sb | Yes | Yes | None |
| Pd | None | Yes | None |
| Al | None | Yes | Yes |
| Cr | None | Yes | Yes |
| Ni—Cr (10% Cr) | None | Yes | None |
| Ni—Cr (25% Cr) | None | Yes | Yes |

The present invention will be described in detail, referring to the accompanying drawings in comparison of the prior art metallic catalyst disclosed in U.S. Pat. Nos. 3,712,856 and 3,956,187.

DESCRIPTION OF THE DRAWINGS

FIG. 3 is a block diagram showing basic steps of one embodiment of the process for preparing a metallic catalyst of the present invention.

FIG. 4 is a cross-sectional sketch of a surface part of one embodiment of the present metallic catalyst.

FIG. 5 is a characteristic diagram showing relations between a catalyst bed temperature and a hydrogen conversion ratio of the present metallic catalysts in comparison with those of the conventional metallic catalyst.

Figure 1:
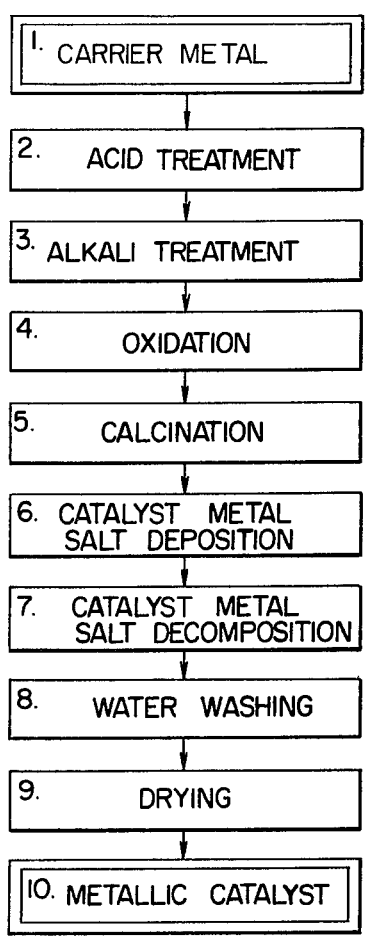
FIG. 1 is a block diagram for preparing the conventional metallic catalyst.

The prior art metallic catalyst is prepared according to the process shown in FIG. 1, where numerals 1 and 10 represent a carrier metal and a catalytic metal, re-

TABLE 1

| | Interlayer metal | Cu | Ni | Ni—Cr alloy (10% Cr) | Fe | Ni—Cr alloy (25% Cr) | Cr | Ti | Al |
|---|---|---|---|---|---|---|---|---|---|
| Metal oxide | Standard free energy change, $\Delta Fo$ (Kcal/mole) | −55 | −80 | −87 | −97 | −98 | −150 | −214 | −230 |
| | Oxide | CuO | NiO | NiO<br>$Cr_2O_3$ | $Fe_2O_3$ | NiO<br>$Cr_2O_3$ | $Cr_2O_3$ | $TiO_2$ | $Al_2O_3$ |
| State of deposited palladium | | Uniformly deposited | | | | Spherically and distributedly deposited | | | | spectively, 2 an acid treatment step, 3 an alkali treatment step, 4 an oxidation step, 5 a calcination step, 6 a catalyst metal salt deposition step, 7 a catalyst metal salt decomposition step, 8 a water washing step, and 9 a drying step. Description will be made of a palladium catalyst as one example.

As the carrier metal 1, a nickel-aluminum alloy carrier is used and nickel on the surface of the nickel-aluminum alloy carrier is dissolved in the acid treatment step 2 to expose aluminum. Then, the exposed aluminum is converted to aluminum hydroxide in the alkali treatment step 3, and then coverted to $\gamma$-alumina in the oxidation step 4 and the calcination step 5. Then, the treated carrier is dipped in an aqueous palladium chloride solution in the catalyst metal salt deposition step 6 to deposit palladium chloride on the alumina. Then, in the catalyst metal salt decomposition step 7, the carrier is heated to about 600° C. to decompose palladium chloride to metallic palladium, and then decomposition products such as chlorine, etc. are washed off therefrom in the water washing step 8, and the treated carrier is dried in the drying step 9 to obtain a palladium catalyst as the metallic catalyst 10.

Figure 2:
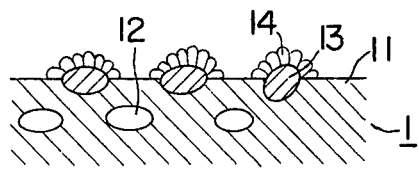
FIG. 2 is a cross-sectional sketch of a surface part of the conventional metallic catalyst.

Cross-sectional sketch of the surface part of the metallic catalyst 10 prepared according to said process is shown in FIG. 2, where numerals 11 and 12 are nickel and aluminum, respectively, which constitute the carrier metal 1, numeral 13 is alumina formed from the aluminum exposed at the surface of nickel 11, and numeral 14 is palladium. That is, the palladium 14 having a catalytic activity is deposited on the alumina 13 exposed at the surface of nickel 11, and a catalytic reaction takes place on the surface of the palladium. However, the palladium 14 is mainly deposited on the alumina 13 exposed at the surface of the carrier, and thus the entire surface of the carrier is not utilized. Furthermore, a portion of the catalyst metal is in direct contact with the carrier metal, causing a temperature drop of the catalyst metal and a decrease in the catalytic activity because the heat of reaction cannot be maintained by the catalyst metal in the low temperature gas atmosphere. Furthermore, the conventional process is based on such a complicated combination of alternating treatments in the solution and in the air that it takes a long time to prepare the metallic catalyst, and also performance or activity of the metallic catalyst as a product depends upon fluctuations in conditions for these steps, and thus the quality control of the product metallic catalyst becomes difficult.

One embodiment of a process for preparing a metallic catalyst according to the present invention is shown in FIG. 3, wherein numeral 21 and 30 represent a carrier metal and catalyst metal, respectively, numeral 22 an interlayer deposition step, numeral 23 a catalyst metal deposition step, numeral 24 an oxidation step, and numeral 25 a reduction step.

In FIG. 4, a cross-sectional sketch of a surface part of a metallic catalyst prepared according to the present process shown in FIG. 3, where numeral 31 is an interlayer supported on the entire surface of the carrier metal 21 and numeral 32 a catalyst metal deposited on the interlayer 31.

PREFERRED EMBODIMENTS OF THE INVENTION

Embodiments of the present invention will be described in detail in the following Examples on the basis of the process shown in FIG. 3.

EXAMPLE 1

A palladium metallic catalyst for recombination of oxygen with hydrogen in a nuclear reactor off-gas and removing the oxygen and hydrogen therefrom is prepared.

Nickel is used as a carrier metal 21, and aluminum is coated on the carrier metal as an interlayer 21 in the interlayer deposition step 22 by the so-called melt plating method, where aluminum is heated to 700°-800° C. and melted, and the carrier metal 21 is dipped in the molten aluminum. Thickness of aluminum plating is controlled to 1-10 $\mu$m by adjusting the melting temperature of aluminum and the dipping time. In the next catalyst metal deposition step 23, palladium is used as the catalyst metal 32. In the deposition of palladium by electroplating method, a current density is made relatively large to reduce the grain size of the deposited palladium. For example, the aluminum-plated nickel carrier metal 21 is immersed as a cathode in an electroplating solution having a composition of 3.7 g/l of palladium chloride, 100 g/l of disodium phosphate, 20 g/l of diammonium phosphate, and 2.5 g/l of benzoic acid, while using platinum as an anode, and a current is allowed to pass therebetween at a current density of about 0.3 A/dm$^2$, thereby depositing palladium plating having a mean thickness of 1-10 $\mu$m. The palladium electro-plated on the aluminum interlayer 31 is heated at about 500° C. in a nitrogen gas atmosphere containing 20% by volume of oxygen in the next oxidation step 24 to oxidize the aluminum and palladium to alumina and palladium oxide, respectively. In the next reduction step 25, the carrier metal having the oxidized interlayer and the oxidized palladium thus obtained is heated at a temperature of 150° C. or higher in a reducing gas of 100% by volume of hydrogen, whereby only palladium oxide is reduced to palladium. The palladium metallic catalyst thus prepared has a three-layer structure as shown in FIG. 4, where the palladium having the catalytic activity is supported on the entire surface of nickel as the carrier metal 21 through alumina as the interlayer 31 formed by oxidation in the oxidation step 24 to provide the metallic catalyst 30.

Hydrogen conversion ratio (ratio of hydrogen concentration at inlet to that at outlet) of the palladium metallic catalyst in comparison with that of the conventional metallic catalyst prepared according to the prior art process discribed above and having a structure as shown in FIG. 2 is given in FIG. 5, wherein a catalyst bed temperature (°C.) is plotted on the abscissa and a hydrogen conversion ratio on the ordinate, and curve A shows the present metallic catalyst (Ni—Al$_2$O$_3$—Pd) and curve B the conventional metallic catalyst (Ni—Al$_2$O$_3$—Pd). As is evident from FIG. 5, the catalytic activity of the present metallic catalyst is higher than that of the conventional catalyst, and also a higher hydrogen conversion ratio can be obtained even in a low temperature, because in the present invention, the entire surface of the carrier metal nickel 21 is effectively utilized, and the catalyst metal palladium 32 is not in direct contact with the carrier metal nickel 21, and thus a transfer rate of the heat of reaction generated on the catalyst metal palladium 32 to the carrier metal 21 is smaller.

In FIG. 5, hydrogen conversion ratio of another embodiment of the present invention, a metallic catalyst (Ni—Cr(Cr$_2$O$_3$)—Pd) using chromium as an interlayer metal prepared in the similar manner to the above is shown as Curve C, where the interlayer metal Cr is readily oxidized to $Cr_2O_3$ to form a mixed layer of Cr and $Cr_2O_3$ which contributes to unevening of the surface state to improve the distribution of Pd and lower the heat conductivity mainly due to the formation of $Cr_2O_3$, thereby increasing the catalytic activity.

Furthermore, comparison of the process steps for preparing the metallic catalyst between the prior art of FIG. 1 and the present invention of FIG. 3 reveals that the process steps of the present invention are considerably more simplified than those of the prior art, resulting in considerable reduction in production time as well as production cost. Generally, the quality of a catalyst depends upon fluctuations in conditions for each of the process steps, but in the present invention, the process steps are simplified, resulting in fewer fluctuations in conditions for the steps, and thus the metallic catalyst can be prepared with an improved quality.

In the foregoing Example, a process for preparing a metallic catalyst for recombination of oxygen and hydrogen in a nuclear reactor off-gas and removing the oxygen and hydrogen therefrom has been described, but the present invention can be applied to the preparation of various catalysts in other fields, where the process steps shown in FIG. 3 can be appropriately modified, depending upon the kinds of interlayer metal and catalyst metal.

EXAMPLE 2

A platinum metallic catalyst for removing acetylene in the acetylene industry is described in the present Example, where nickel is used as the carrier metal 21, and titanium is used as the interlayer metal having a low heat conductivity by itself. At first, in the interlayer deposition step 22, the carrier metal nickel 21 is immersed as cathode in an aqueous titanium chloride (5 g/l) solution, while using platinum as an anode, and a current is allowed to pass therebetween at a current density of about 5 $A/dm^2$ to obtain a titanium plating having a thickness of 1-10 μm. Then, in the catalyst metal deposition step 23, platinum is deposited as the catalyst metal 32 on the titanium plating. According to an example of the platinum plating, the titanium-plated carrier metal nickel is immersed as a cathode in an electroplating bath containing 4 g/l of chloroplatinic acid, 20 g/l of ammonium phosphate, and 100 g/l of sodium phosphate, while using platinum as an anode, and a current is allowed to pass therebetween at a current density of about 1 $A/dm^2$ to obtain a platinum plating having a thickness of 1-10 μm. The platinum is supported on the nickel through the titanium interlayer. In this case, the interlayer titanium itself has a low heat conductivity, and it is not necessary to oxidize the titanium interlayer in contrast to Example 1, and thus the resulting platinum-plated catalyst can be used as a metallic catalyst as such without subjecting it to the oxidation step 24 and the reduction step 25. The metallic catalyst thus prepared can work with the similar effects to those of Example 1, and the process steps can be much more simplified than in Example 1.

EXAMPLE 3

A palladium oxide metallic catalyst effective as a catalyst for the exhaust gas from automobiles is prepared in the present Example, where iron is used as the carrier metal 21 and aluminum as the interlayer metal 31. The interlayer aluminum can be coated on the carrier metal in the interlayer deposition step 22 by dipping the carrier metal in the molten aluminum as in Example 1, but is made, in the present Example, to be deposited by electroplating using an aqueous aluminum chloride (5 g/l) solution to obtain an aluminum plating having a thickness of 1-10 μm, wherein the carrier metal is used as a cathode while using platinum as an anode. The aluminum plated carrier metal 21 is further plated with palladium to a thickness of 1-10 μm on the aluminum in the next catalyst metal deposition step 23. The plating conditions may be the same as in Example 1, but in the present Example, it is not necessary to activate the catalyst metal 32 in the reduction step 25, and thus the palladium grain size must be reduced by increasing the current density. In the present Example, an electroplating bath contains 6 g/l of aqua ammonia and 10 g/l of ammonium chloride in addition to 5 g/l of palladium chloride, and is adjusted to pH 0.1-0.5 by hydrochloric acid. After the electroplating of catalyst metal palladium, the palladium and the aluminum are oxidized to alumina and palladium oxide, respectively, in the oxidation step 24 in a nitrogen gas atmosphere containing about 20% by volume of oxygen, whereby the palladium oxide 32, is supported on the carrier metal iron 21 through the alumina interlayer 31. The metallic catalyst thus prepared as such has a catalytic activity for removal of carbon monoxide or hydrocarbons from the exhaust gas by oxidation, and thus the successive reduction step 25 can be omitted. The metallic catalyst can work with the similar effect to those of the foregoing Example 2 and 3, and the improvement of the catalytic activity and the simplification of the process steps can be effectively attained.

As described above, the present process is based on the process steps shown in FIG. 3, and the present process steps can be appropriately simplified or omitted, depending upon the kinds of interlayer metals and catalyst metals. That is, when a metal having a low heat conductivity by itself, such as titanium, zirconium, or antimony, is used as an interlayer metal, it is not necessary to oxidize such interlayer metal. Thus, the oxidation step and the reduction step can be omitted. When a metal having a catalytic activity, which is produced by oxidation, is used as a catalyst metal, the reduction step after the oxidation step will not be necessitated. Metallic catalysts prepared according to any variation of the present process have similar effect on their catalytic activity, and the process steps can be effectively more simplified than the basic process steps shown in FIG. 3.

That is, the catalyst metals of these Examples can effectively utilize the entire surface of the carrier metal, and thus the catalytic activity can be improved, and especially the lowering of the catalytic activity at a low temperature can be prevented. That is, a catalyst bed can be made more compact, and the process steps can be more simplified thereby, so that the production time and production cost can be reduced, and the quality control of the metallic catalyst can be effectively attained.

The present invention is not restricted to the specific metallic catalysts, but is applicable to the production of various metallic catalysts used in various fields of industries.

The present invention can provide metallic catalysts having a good catalytic activity, especially, at a low temperature, and a process for preparing such metallic catalysts, and thus has a remarkable industrial significance.

What is claimed is:

1. A metallic catalyst, which comprises a carrier metal, an interlayer metal having a good heat-insulating property or a good catalyst surface area-increasing property deposited on the entire surface of the carrier metal, and a catalyst metal deposited on the interlayer metal wherein the interlayer metal having a good heat-insulating property is a metal having a low heat conductivity by itself and is titanium, zirconium, antimony, or their alloys.

2. A metallic catalyst according to claim 1, wherein the carrier metal is a porous metal.

3. A metallic catalyst according to claim 1, wherein the catalyst metal has a catalytic activity by oxidation.

4. A metallic catalyst according to claim 1, wherein the catalyst metal has a catalytic activity by oxidation and successive reduction.

5. A metallic catalyst according to claim 1, wherein the interlayer metal and the catalyst metal are deposited by plating.

6. A metallic catalyst, which comprises a carrier metal, an interlayer metal having a good heat-insulating property or a good catalyst surface area-increasing property or both deposited on the entire surface of the carrier metal, and a catalyst metal electroplated on the interlayer metal wherein the interlayer metal and the catalyst metal are oxidized after the catalyst metal is electroplated on the interlayer metal, and also wherein the interlayer metal is a metal capable of forming an oxide having a low heat conductivity or a catalyst area-increasing property or both and is titanium, palladium, zirconium, antimony, or their alloys.

7. A metallic catalyst comprising a nickel porous metal carrier, a chromium or its alloy interlayer metal, and a palladium catalyst deposited on the interlayer by plating.

8. A metallic catalyst which comprises a carrier metal, an interlayer metal having a good heat-insulating property or a good catalyst surface area-increasing property or both deposited on the entire surface of the carrier metal, and a catalyst metal deposited on the interlayer metal wherein the interlayer metal is a metal capable of forming an oxide having a low heat conductivity or a catalyst area-increasing property or both and is titanium, palladium, zirconium, antimony, or their alloys.

9. A metallic catalyst according to claim 6 or 8, wherein the carrier metal is a porous metal.

10. A metallic catalyst according to claim 8, wherein the catalyst metal has a catalytic activity by oxidation.

11. A metallic catalyst according to claim 8, wherein the catalyst metal has a catalytic activity by oxidation and successive reduction.

12. A metallic catalyst according to claim 8, wherein the interlayer metal and the catalyst metal are deposited by plating.

13. The metallic catalyst of claim 6, wherein the interlayer metal is deposited by plating.

14. A process for preparing a metallic catalyst which comprises a carrier metal, an interlayer metal having a good heat-insulating property or a good catalyst surface area-increasing property deposited on the entire surface of the carrier metal, and a catalyst metal deposited on the interlayer metal wherein the interlayer metal is titanium, zirconium, antimony or their alloys, comprising the steps of:
   providing a carrier metal;
   depositing the interlayer metal on the entire surface of the carrier metal by plating; and
   depositing the catalyst metal on the interlayer metal by plating.

15. A process according to claim 14, wherein the carrier metal is a porous metal.

16. A process according to claim 14, wherein the step of oxidizing a catalyst metal is followed by a step of oxidizing the deposited catalyst metal.

17. A process according to claim 14, wherein the step of depositing a catalyst metal is followed by a step of oxidizing the deposited catalyst metal, and further by a step of reducing the oxidized catalyst metal.

18. A process according to claim 14, wherein the interlayer metal and the catalyst metal are successively deposited by plating.

19. A process according to claim 14, wherein the interlayer metal is plated by electroplating or dipping, and the catalyst metal is plated by electroplating.

20. The process of claim 14, wherein the steps of plating are electroplating.

21. A process for preparing a metallic catalyst, which comprises a carrier metal, an interlayer metal having a good heat-insulating property or a good catalyst surface area-increasing property or both deposited on the entire surface of the carrier metal, and a catalyst metal electroplated on the interlayer metal wherein the interlayer metal is a metal capable of forming an oxide having a low heat conductivity or a catalyst area-increasing property or both and is aluminum, titanium, palladium, zirconium, antimony, or their alloys comprising the steps of:
   providing a carrier metal;
   depositing the interlayer metal on the carrier metal by electroplating;
   depositing the catalyst metal on the interlayer metal by electroplating; and
   oxidizing the interlayer metal and the catalyst metal.

22. A process for preparing a metallic catalyst which comprises a carrier metal, an interlayer metal having a good heat-insulating property or a good catalyst surface area-increasing property or both deposited on the entire surface of the carrier metal, and a catalyst metal deposited on the interlayer metal wherein the interlayer metal is a metal capable of forming an oxide having a low heat conductivity or a catalyst area-increasing property or both and is titanium, palladium, zirconium, antimony, or their alloys, comprising the steps of:
   providing a carrier metal;
   depositing the interlayer metal on the carrier metal; and
   depositing the catalyst metal on the interlayer metal.

23. A process for preparing a metallic catalyst, which comprises a carrier metal, an interlayer metal having a good heat-insulating property or a good catalyst surface area-increasing property or both deposited on the entire surface of the carrier metal and a catalyst metal deposited on the interlayer metal wherein the metal having a good catalyst surface area-increasing property is aluminum, titanium, palladium, zirconium or antimony comprising the steps of:
   providing a carrier metal;
   depositing the interlayer metal on the carrier metal by electroplating;
   depositing the catalyst metal on the interlayer metal by electroplating; and
   thereafter oxidizing the interlayer metal and the catalyst metal.

24. A process according to claim 21, or 23 wherein the carrier metal is a porous metal.

25. A process according to claim 22, wherein the interlayer metal and the catalyst metal are successively deposited by plating.

26. A process according to claim 22, where the interlayer metal is plated by electroplating or dipping and the catalyst metal is plated by electroplating.

27. A process according to claim 22, wherein the step of depositing the interlayer metal is followed by a step of oxidizing the deposited interlayer metal.

28. A process according to claim 22, wherein the step of depositing a catalyst metal is followed by a step of oxidizing the deposited catalyst metal.

29. A process according to claim 22, wherein the step of depositing a catalyst metal is followed by a step of oxidizing the deposited catalyst metal and further by a step of reducing the oxidized catalyst metal.

30. A metallic catalyst prepared according to the process comprising the steps of:
providing a carrier metal;
depositing on the entire surface of the carrier metal an interlayer metal having a good heat-insulating property or a good catalyst surface area-increasing property, the interlayer metal being a metal having a low heat conductivity by itself and being titanium, zirconium, antimony, or their alloys; and
depositing a catalyst on the interlayer metal.

31. A metallic catalyst prepared according to the process comprising the steps of:
providing a carrier metal;
depositing on the entire surface of the carrier metal an interlayer metal having a good heat-insulating property or a good catalyst surface area-increasing property or both, the interlayer metal being a metal capable of forming an oxide having a low heat conductivity or a catalyst area-increasing property or both and also being titanium, palladium, zirconium, antimony or their alloys;
depositing by electroplating a catalyst on the interlayer metal; and
thereafter oxidizing the interlayer metal and the catalyst metal.

32. A metallic catalyst prepared according to the process comprising the steps of:
providing a carrier metal;
depositing on the entire surface of the carrier metal an interlayer metal having a good heat-insulating property or a good catalyst surface area-increasing property or both, the interlayer metal being a metal capable of forming an oxide having a low heat conductivity or a catalyst area-increasing property or both and also being titanium, palladium, zirconium, antimony, or their alloys; and
depositing a catalyst on the interlayer metal.

33. A metallic catalyst prepared according to the process of claim 30, 31 or 32, wherein the carrier metal is a porous metal.

34. A metallic catalyst prepared according to the process of claim 30 or 32, wherein the step of depositing the interlayer metal is followed by a step of oxidizing the deposited interlayer metal.

35. A process according to claim 30 or 32, wherein the step of depositing a catalyst metal is followed by a step of oxidizing the deposited catalyst metal.

36. A metallic catalyst prepared according to the process of claim 30 or 32, wherein the step of depositing a catalyst metal is followed by a step of oxidizing the deposited catalyst metal, and further by a step of reducing the oxidized catalyst metal.

37. A metallic catalyst prepared according to the process of claim 30 or 32, wherein the interlayer metal and the catalyst metal are successively deposited by plating.

38. A metallic catalyst prepared according to the process of claim 30 or 32, wherein the interlayer metal is deposited by electroplating or dipping, and the catalyst metal is deposited by electroplating.

39. A metallic catalyst prepared according to the process of claim 31, wherein the interlayer metal is deposited by electroplating.

40. A metallic catalyst according to claim 6, wherein the catalyst metal has activity by reduction.

41. A metallic catalyst according to claim 6, wherein the interlayer metal is deposited by plating.

42. A process according to claim 21 or claim 23 wherein the oxidizing step is followed by a step of reducing the oxidized catalyst metal.

43. A metallic catalyst prepared according to the process of claim 31, wherein the interlayer metal is deposited by plating.

44. A metallic catalyst comprising a carrier metal, a chromium interlayer metal deposited on the entire surface of the carrier metal by plating, and a palladium catalyst deposited on the interlayer metal by plating.

45. A process for preparing a metallic catalyst, comprising a carrier metal, a chromium interlayer deposited on the entire surface of the carrier metal, and a palladium catalyst deposited on the interlayer, comprising the steps of:
providing a carrier metal;
depositing the chromium interlayer by plating; and
depositing the palladium catalyst by plating.

46. The process of claim 45 further including:
oxidizing the chromium interlayer and palladium catalyst after the palladium is deposited on the chromium; and
reducing the oxidized palladium.

47. A metallic catalyst prepared according to the process comprising the steps of:
providing a carrier metal;
depositing a chromium interlayer on the entire surface of the carrier metal by plating; and
depositing a palladium catalyst on the interlayer by plating.

* * * * *